United States Patent
Billington

(12) 
(10) Patent No.: US 6,340,373 B1
(45) Date of Patent: Jan. 22, 2002

(54) PROCESS FOR RECOVERING AND TREATING OF AQUEOUS SOLUTIONS

(75) Inventor: Per H. Billington, Slependen (NO)

(73) Assignee: Kvaerner Process Systems A.S., Billingstadt (NO)

( * ) Notice: Subject to any disclaimer, the term of this patent is extended or adjusted under 35 U.S.C. 154(b) by 0 days.

(21) Appl. No.: 09/380,389
(22) PCT Filed: Mar. 5, 1998
(86) PCT No.: PCT/NO98/00072
  § 371 Date: Aug. 27, 1999
  § 102(e) Date: Aug. 27, 1999
(87) PCT Pub. No.: WO98/39076
  PCT Pub. Date: Sep. 11, 1998

(30) Foreign Application Priority Data

Mar. 5, 1997 (NO) .............................................. 971004

(51) Int. Cl.$^7$ ................................................. B01D 9/02
(52) U.S. Cl. ...................... 23/295 R; 23/302 R; 23/304
(58) Field of Search ........................... 23/295 R, 302 R, 23/304

(56) References Cited

U.S. PATENT DOCUMENTS 3,679,376 A * 7/1972 Flint et al. ..................... 23/304
3,933,977 A   1/1976 Ilardi et al. ................. 423/206
4,299,799 A   11/1981 Ilardi et al. ................. 423/206

FOREIGN PATENT DOCUMENTS

EP      0376230      7/1990    ......... C07C/227/18

* cited by examiner

Primary Examiner—Wayne Langel
(74) Attorney, Agent, or Firm—Abelman, Frayne & Schwab

(57) ABSTRACT

There is described a method for the treatment and processing of solutions of an organic fluid, water and one or more compounds of alkaline earth metals, alkali metals and metal ions, comprising the following steps: a) conducting a stream (5) consisting of organic fluid, water and one or more compounds of alkaline earth metals, alkali metals and metals ions to a salt reduction and crystallization unit (6), b) evaporating and optionally partially condensing the stream (5) and providing thereby a steam (9, 10) of evaporated water and organic solvent and a steam (8) of organic fluid and the compounds of alkaline earth metals, alkali metals and/or metal ions, c) conducting the steam (8) consisting substantially of organic fluid and the compounds of alkaline earth metals, alkali metals and/or metals ions to a salt reduction means (24), d) nucleating crystals of the compounds of alkaline earth metals, alkali metals and/or metal ions by means of depressurization and temperature increase, e) removing the portion of the precipitated crystals and/or particles from the organic fluid. The method is particularly well suited for processing of solution consisting of mono-, di, tri, or polyethyleneglycol or mixtures thereof. There is also described a means for carrying out the method.

6 Claims, 4 Drawing Sheets

PROCESS FOR RECOVERING AND TREATING OF AQUEOUS SOLUTIONS

The present invention relates to a method and a system for recovery and treatment of aqueous solutions.

In recovery of gas from subterranean formations, the gas that is produced could possibly contain some water. The amount of water produced will vary from one deposit to another. The major portion of the water that is transported with the gas through a pipeline, however, is produced by the so-called Joule-Thompson effect. This involves the effect that the gas is cooled as it loses pressure on moving through a constriction, such as a valve, or through a pipeline. The result is that water in the gas is condensed out. For this reason it is often advisable and/or necessary to inject a hydrate inhibitor. A simple and readily available hydrate inhibitor is methanol. A better alternative, however, is glycol, as glycol will in addition have a corrosion-inhibiting effect.

The water produced will often contain various metals, particularly alkaline earth metals such as magnesium, calcium, strontium, barium and radium. These metals exhibit a tendency to form deposits in the presence of carbonates and sulfates, or if the temperature of the concentration is raised and/or if the pH is increased. The deposits could appear, for example, on heat exchangers and on the inside of pipelines.

For a gas plant in operation, when glycol injection is employed there will be circulated substantial amounts of glycol, which on return from the pipeline will be in the form of a contaminated solution, typically containing about 60% of glycol, water and an increased content of various salts. To permit the reuse of the glycol, a prerequisite is that it must have a concentration of about 90%, and that impurities such as salts, etc., are reduced or eliminated in order to comply with requirements from the process plant.

Glycol injection has previously been used in only a relatively modest degree. One of the reasons for this is probably the existence of precisely these problems associated with recovery of the glycol in a sufficiently pure state. Some attempts have been made to solve these problems, but few of these seem to function satisfactorily.

At the plant in Bacton, England, the water is removed from the glycol by a process of evaporation. A filter uses compressed air to force the liquid through a filter cloth, and the solid substances are scraped off mechanically. This is a solution to the task that is not well suited for implementation at a gas field.

In the U.S.A. and Canada there are plants for the recovery of triethylene glycol and amines which operate with batch processes. It is assumed that the extent of salt contamination of triethylene glycol (TEG) is relatively low. The operation of these plants generally involves the evaporation and condensation of all liquid under a vacuum. There does not appear to be any practical method for disposing of the salt residues, which are a mixture of salt crystals and other impurities in glycol/salt water solution.

ELF Aquitaine Production is owner of a patent directed toward the purification and regeneration of glycol solutions. This technology is said to be useful for the treatment Is of effluents from gas hydrate inhibition processes or natural gas dehydration. The method utilizes an electrically powered sandwich diaphragm system to redirect positive and negative ions in the solution into a secondary water stream. Hydrogen gas is released in the diaphragm and may constitute a problem in a plant. The mentioned technology does not appear to be commercialized.

There are a number of known deposits of gas throughout the world which have not yet been put into production, mainly due to the fear of a high salt content and the consequent problems related to disposal and purification. A satisfactory solution to this disposal problem could render more of these disposits commercially exploitable.

Therefore, there is a need for a method and a system by which it is possible to remove both water and salts in a satisfactory manner from the contaminated glycol solution.

The method should be one which may be carried out continuously. Also, some of the salts which may be present in the glycol solution, for example, barium and strontium compounds, would be considered radioactive impurities, which would require treatment in a "closed" system. This need would also have to be met by a method and a system of the above mentioned type.

This task is solved with the present invention by a method for the treatment and processing of solutions of an organic fluid, water and one or more compounds of alkaline earth metals, alkali metals and metal ions, which method is characterized by comprising the following steps:

a) conducting a stream consisting of organic fluid, water and one or more compounds of alkaline earth metals, alkali metals and metal ions to a salt reduction and crystallization unit, b) evaporating and optionally partially condensing the stream and providing thereby a stream of evaporated water and organic solvent and a stream of organic fluid and the compounds of alkaline earth metals, alkali metals and/or metal ions, c) conducting the steam consisting substantially of organic fluid and the compounds of alkaline earth metals, alkali metals and/or metal ions to a salt reduction means, d) nucleating crystals of the compounds of alkaline earth metals, alkali metals and/or metal ions by means of depressurization and temperature increase, e) removing the portion of the precipitated crystals and/or particles from the organic fluid.

Additional advantageous features of the method are disclosed in the dependent claims.

The invention also relates to a means for carrying out the method, which is characterized in that it comprises a means for reduction of salts of alkaline earth metals, alkali metals and/or metal ions and a means for the separation of water and organic fluid.

Further advantageous features of the apparatus are disclosed in the associated dependent claims.

The concept is particularly well suited for continuous salt removal from large glycol systems which may be expected continuously to accumulate salts and other impurities. Consequently the present invention would be useful in polyphase transport and/or in pipeline systems which transport wet gas requiring hydrate inhibition, for the salt and other impurities would be withdrawn from the bulk glycol volume as rapidly as they enter it. This results in the control of the salt concentration while the inflow of salt is uniform and continuous, for example, as in the case of production with the gas, condensate and/or oil from the well heads. Wet gas and polyphase pipelines from the production system which have saline or contaminated water that could enter the pipeline may also derive benefit from the invention. The production system may, for example, decant the water via a three-phase separator, as the two hydrocarbon phases are permitted to enter a common pipeline. A small, but final stream of water from the three-phase separator can be expected to contaminate the fluids in the pipeline with salts, etc., because of the normally expected separation effectiveness of these types of separators. In operations where glycol is injected into the pipeline, one would expect that the salt contamination would leave the pipeline at the receival end together with the glycol.

In gas dehydration and in sweetening processes, the solvents—such as triethylene glycol (TEG), amines, etc.— are expected to absorb the same impurities as in the pipeline system, which can be the cause of foam formation in the systems, reduced efficiency of the separation process, and deposits in the regeneration system. With the aid of the present invention, this concern can already be dealt with in the planning stage, and it will be possible to control and remove the salt impurities.

The invention will be explained in more detail in the following with the aid of embodiment examples and with reference to the accompanying drawings.

Figure 1:
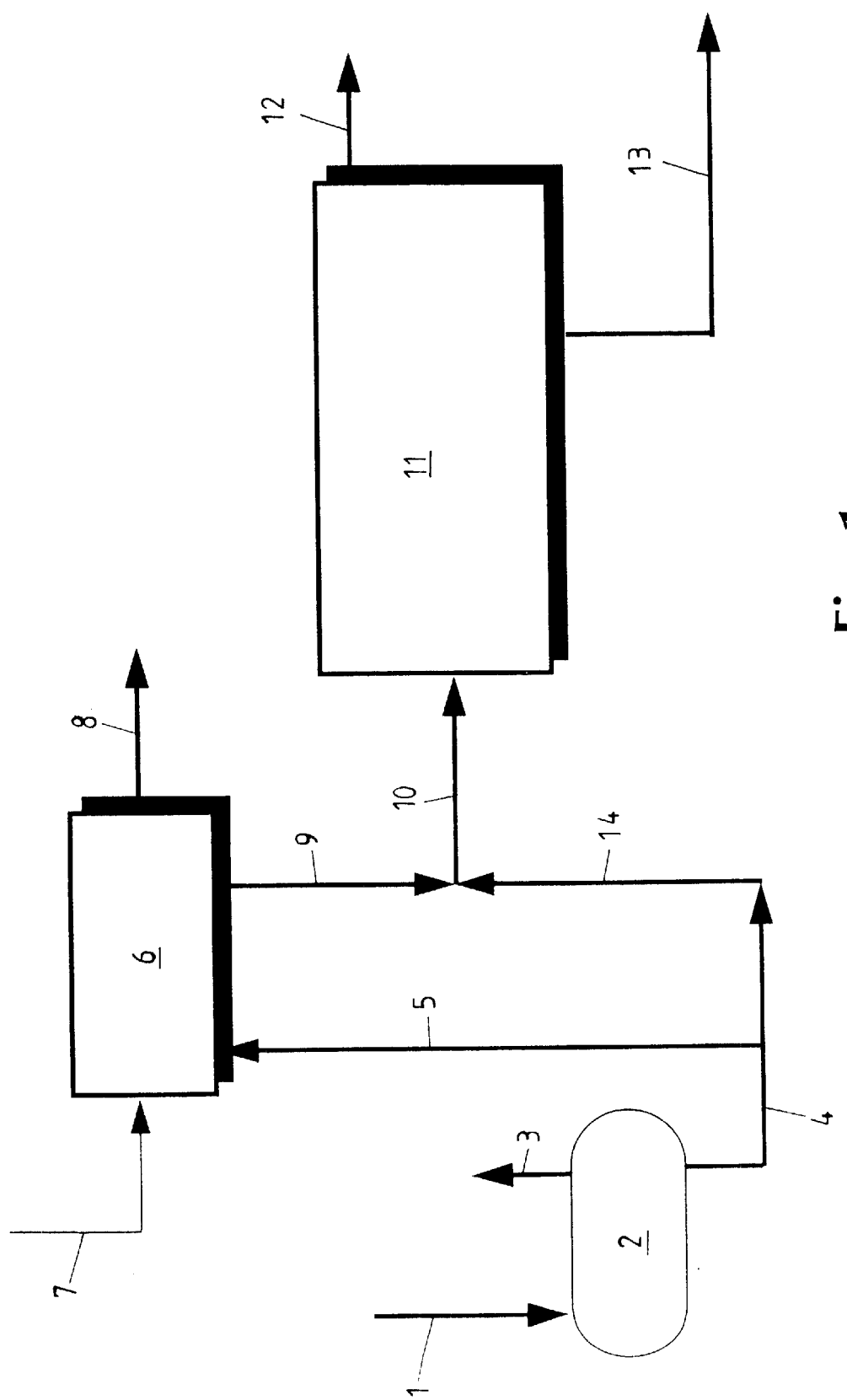
FIG. 1 is a schematic illustration of a system for regeneration of water and saline glykol in accordance with the present invention.

FIG. 1 shows a diagram of the principle behind a continuous system for the removal of salts and water from an impure glycol stream 1. Steam 1 of contaminated glycol containing entrained gases from previous separation stages is fed into a deaerator 2, where the pressure is reduced, such that entrained gas is released and removed as a stream 3 for further treatment. This gas may be, for example, residues of hydrocarbons, $CO_2$, $H_2S$, $N_2$ and the like. The liquid fraction is sent out of deaerator 2 as a stream 4, and led further as a stream 5 into a salt reduction unit 6, where the salts in the contaminated glycol are removed as a stream 8. This stream 8 contains crystallized compounds of alkaline earth metals, alkali metals and metal ions such as, for example, calcium, magnesium, strontium, sodium and iron in the form of carbonates, sulfates, chlorides and the like. The pH in the salt reduction unit is regulated with the aid of a pH regulation unit 7. The remaining portion, consisting mainly of glycol and water, is removed from the salt reduction unit 6 as a stream 9 and fed into a water reduction unit 11 as a stream 10. In water reduction unit 11 the water and glycol are separated and removed as, respectively, a water stream 12 and a glycol stream 13.

When the system is started up or when the salt content of the contaminated glycol is relatively low, all or a portion of stream 4 from deaerator 2 may be fed directly into the water reduction unit 11 as a substream 14.

Figure 2:
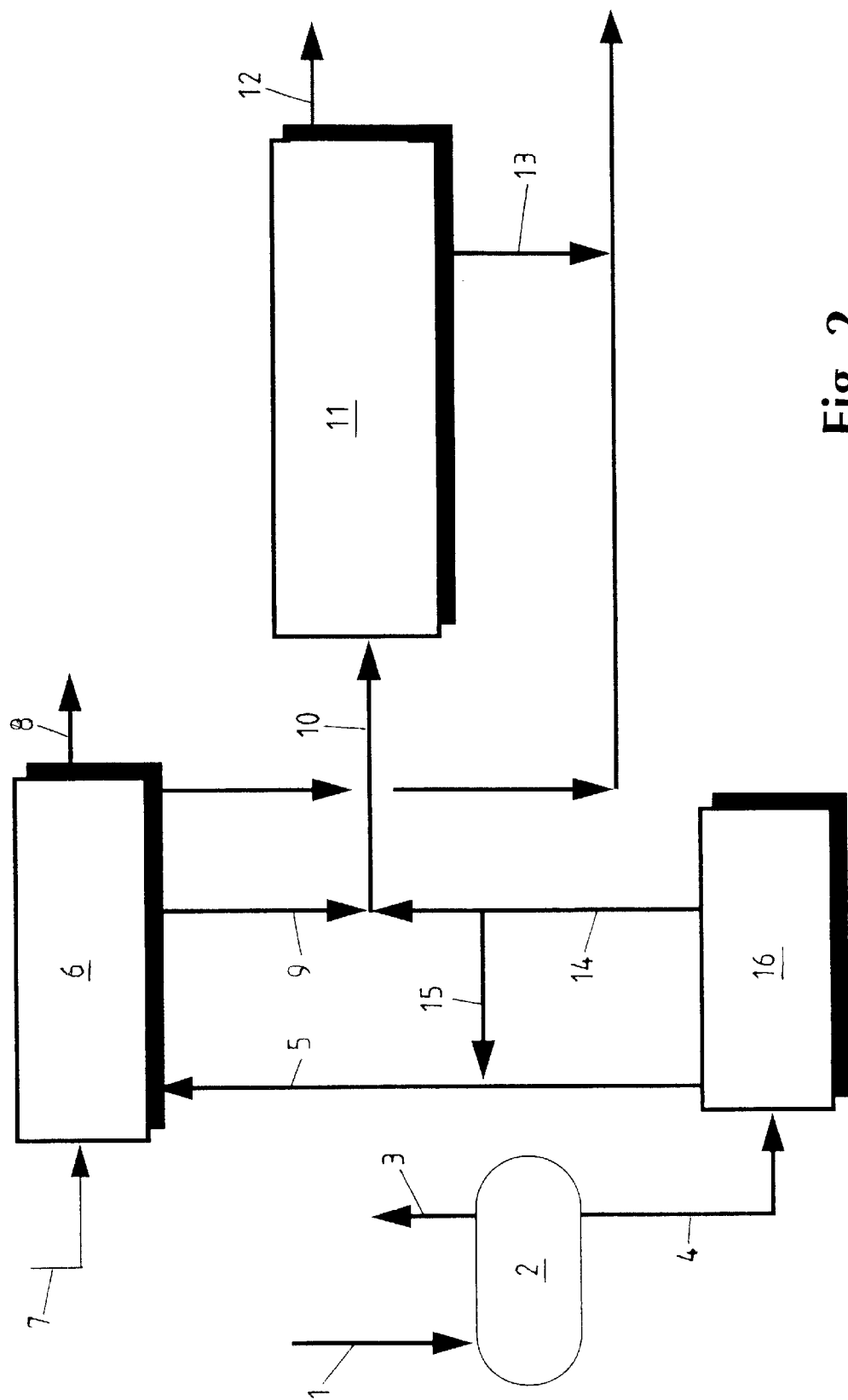
FIG. 2 shows a variant of the embodiment form in FIG. 1.

In FIG. 2 there is illustrated a variant of the system shown in FIG. 1. Identical components of the streams in FIGS. 1 and 2 have been assigned the same reference numbers. In order to reduce the load on the salt reduction means and thereby the size of this apparatus, a separation of salts is undertaken in a diaphragm separator 16. Another purpose of the diaphragm separator 16 is to remove salts, particularly those containing bivalent ions, which can cause the formation of deposits in heat exchangers later in the system. In diaphragm separator 16 it is expected that small molecules, such as glycol, water and some smaller metal ions, will pass through the diaphragm, while heavier metals (which are hydrated) will be retained. The retention stream from separator 16 is conducted to the salt reduction means 6 as a stream 5, and the permeation matter from the separator is removed as a stream 14 and combined with stream 9 from the salt reduction unit to a stream 10, which is conducted to the water reduction unit 11. This separation of stream 4 from deaerator 2 has the result that stream 5, which is conducted to salt reduction means 6, may be reduced to the order of 15–30 percent by volume of stream 4 from deaerator 2. The permeation stream 14 from separator 16 is on the order of 70–85 percent by volume of the stream 4 from deaerator 2.

If high sodium concentrations are expected, it may be necessary in periods to conduct a part of the permeation stream to salt reduction unit 6 as a stream 15.

Figure 3:
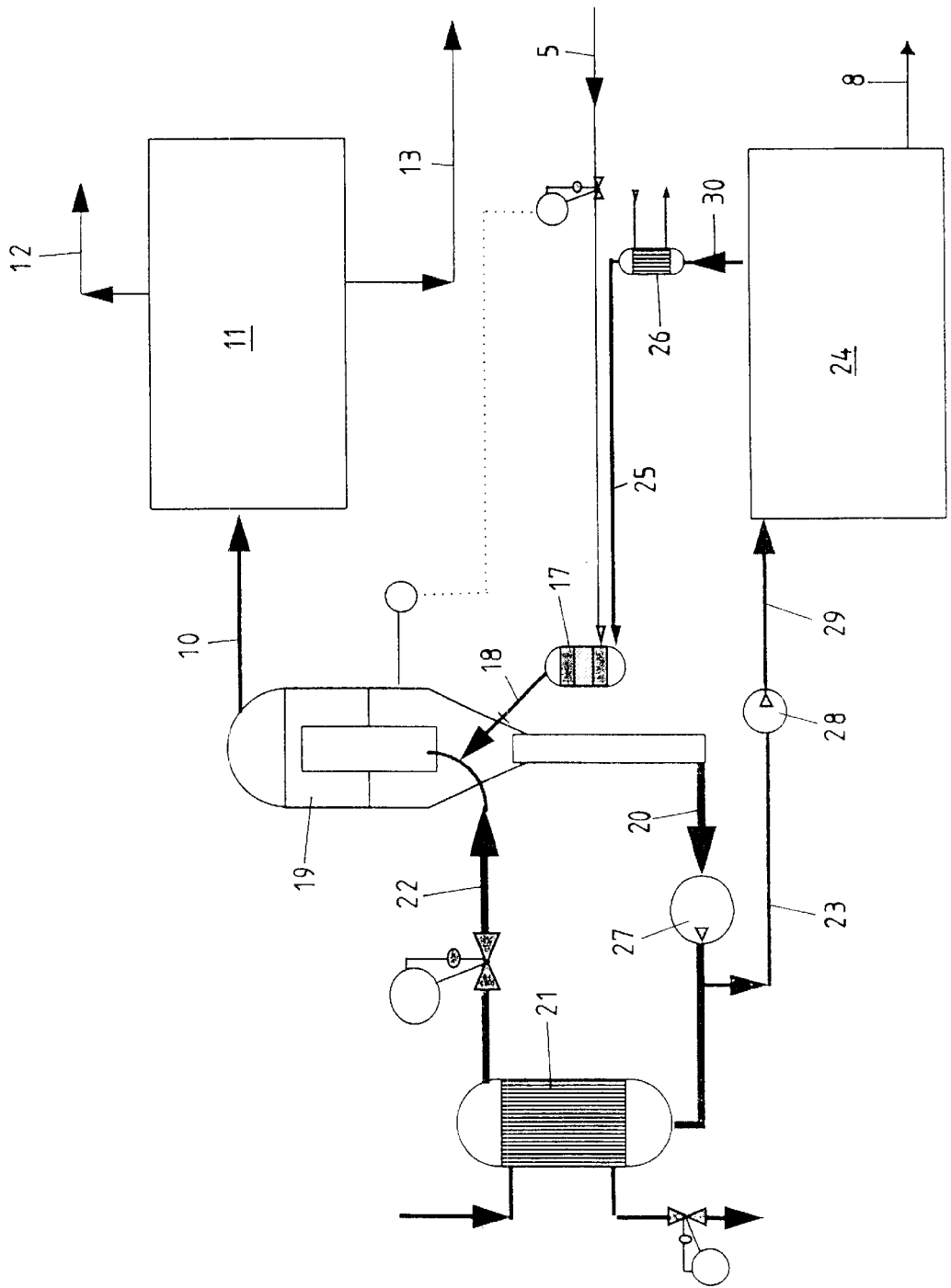
FIG. 3 is a schematic illustration of a part of the system in FIGS. 1 and 2.

In FIG. 3 the water reduction unit and salt reduction unit are shown in more detail. Stream 5 from deaerator 2 (FIG. 1) or diaphragm separator 16 (FIG. 2) is conducted to a nucleator 17. In nucleator 17 stream 5 is mixed with a stream 25. Stream 25 will be explained in more detail later on. Nucleator 17 is a device wherein a warm, saline (supersaturated), nearly anhydrous, supersaturated, organic stream 25 is brought into contact with a cold, hydrous stream 5 which is below or slightly above saturation. In the nucleator there will occur a rapid depressurization and mixture of the two streams 5 and 25. In combination with the sustained supersaturation of the solution, there will occur a homogeneous (primary) and heterogeneous (secondary) nucleation of crystals in the solution, instead of the nucleation taking place on the surface of subsequent equipment, such as heat exchangers.

From nucleator 17 the combined stream 18, which has been depressurized and mixed, is conducted to an evaporator 19. Here the stream 18 from the nucleator is heated and mixed with a stream 22 from the heat exchanger 21, so that the water and a portion of the glycol are evaporated. This vapor is conducted out as a stream 10 to a water reduction system 11. In water reduction system 11, a single- or multi-phase condensation takes place, where the water is sent out as a stream 12 and the glycol is sent out as a stream 13.

The nearly anhydrous, saline glycol is sent out of evaporator 19 as a stream 20. This stream 20 is conducted via a pump 27 through heat exchanger 21, heated in heat exchanger 21 and conducted as a stream 22 back into evaporator 19. Streams 20 and 22 constitute what may be referred to as the evaporator circuit. The ratio of streams 20 and 22 in the evaporator circuit and the stream 18 added thereto is on the order of from 0.5:1 to 20:1.

A portion of the solution in the evaporator circuit is conducted out prior to heat exchanger 21 as a stream 23. This stream 23 is conducted via a pump 28 as a stream 29 to a separation system 24, where a separation of glycol and particles in the form of salt crystals takes place.

Separation system 24 may consist of, for example, filters, cyclones, and the like, or combinations of such known particle separation means. For example, separation system 24 may constitute two stages, where the first stage separates out particles on the order of 2–20 microns, and the second stage separates particules on the order of 50–500 microns.

The particle fraction is conducted out as a stream 8, while the glycol fraction is sent out as a stream 30, via a heat exchanger 26, and further as a stream 25 to nucleator 17.

Laboratory experiments have shown that the use of ultrasound improves the reaction kinetics for nucleation in the solution. The nucleator may therefore be designed for inclusion of ultrasound equipment.

Figure 4:
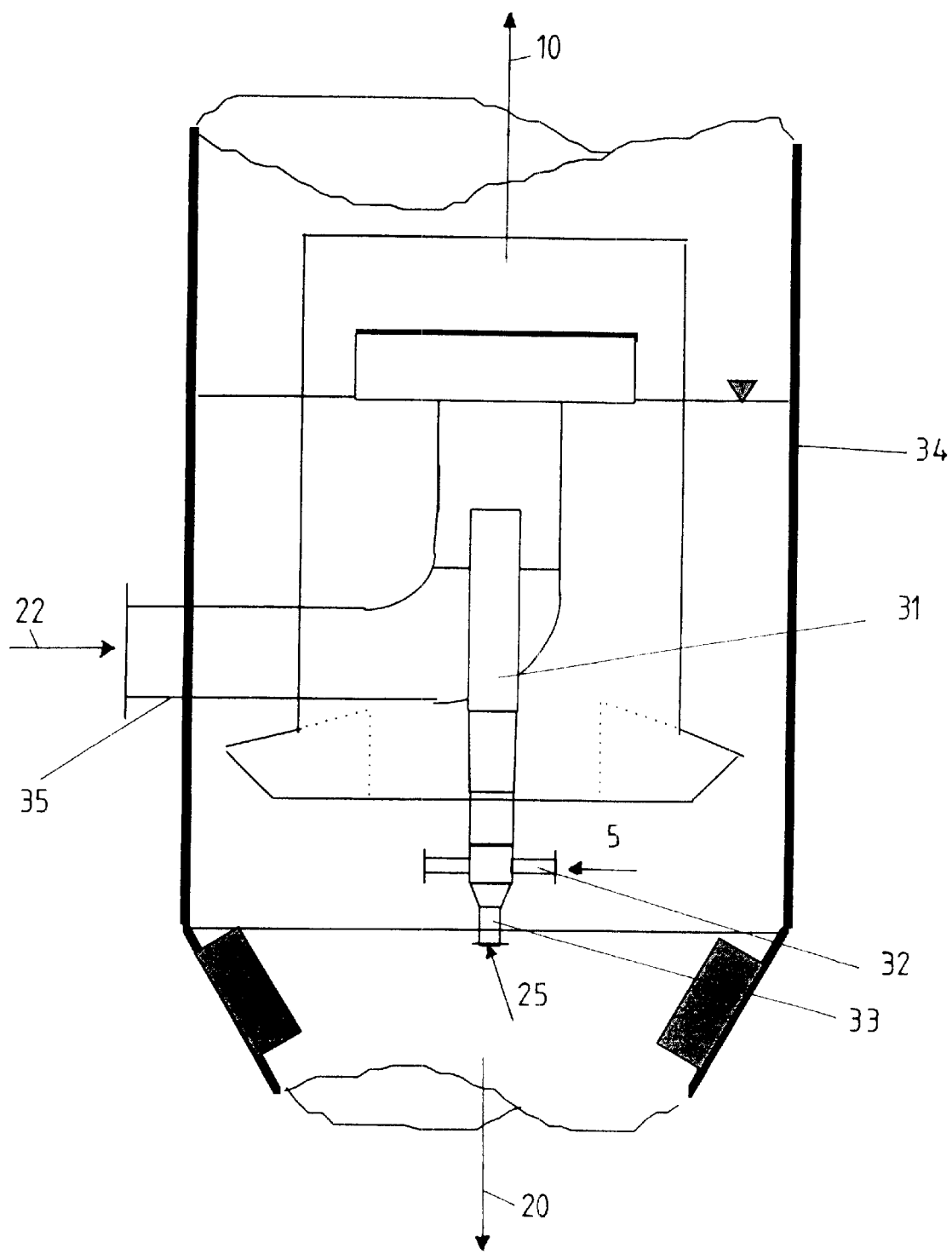
FIG. 4 shows an embodiment form of a nucleator according to the invention.

In FIG. 4 there is shown an embodiment form wherein the nucleator and evaporator are combined into one unit. The figure is a section through the combined evaporator and nucleator and illustrates the principles therefor.

The nucleator 31 consists of a centrally disposed tubular body, having at the lower end thereof two or more inlets 32 for the stream 5 of glycol, water and salts to be treated, and one or more inlets 33 for the purified glycol stream 25. Nucleator 31 is placed inside the evaporator tank 24. A stream of warm, saline glycol 22 is fed into evaporator tank 34 via an inlet 35. At the bottom of nucleator 31 there will occur a mixture of the two streams 32, 33, simultaneously with a depressurization. Stream 22 will heat up nucleator 31, causing an evaporation of water and some of the glycol to occur. The vapor is conducted out of evaporator tank 34 as a stream 10, and led further to the glycol/water separation unit 11 shown in the preceding figures. The salt enriched, supersaturated glycol fraction is conducted out of evaporator tank 34 as a stream 20, and pumped and heated as shown in FIG. 3.

As an example of the processing of monoethylene glycol, the operational parameters could be as follows:

| Stream no. | Volume | Temperature | Pressure, abs. |
|---|---|---|---|
| Stream 22 | 340 m$^3$/h | | |
| Stream 5 | 12 m$^3$/h | 27° C. | 2.5 bar |
| Stream 25 | 40 m$^3$/h | 135° C. | 2.5 bar |
| Stream 10 | 500 m$^3$/h | | |

The pressure at the mixing point between stream 5 and 25 at the bottom of nucleator 31 will, in this case, be about 0.15 bar absolute, and the temperature for the fluid in the nucleator will be about 90° C.

What is claimed is:

1. A method for the treatment and processing of solutions of an organic fluid, water, and at least one member selected from the group consisting of alkaline earth metals, alkali metals, metal ions, and mixtures thereof, which comprises the following steps:
   (a) conducting a stream (5) consisting of organic fluid, water, and at least one member selected from the group consisting of alkaline earth metals, alkali metals, metal ions, and mixtures thereof, to a salt reduction and crystallization unit (6);
   (b) flash evaporating and optionally partially condensing the stream (5) and providing thereby a stream (9, 10) of evaporated water and organic solvent and a stream (8) of organic fluid and at least one member selected from the group consisting of alkaline earth metals, alkali metals, metal ions, and mixtures thereof;
   (c) conducting the stream (8) to a salt reduction unit;
   (d) nucleating crystals via at least one member selected from the group consisting of alkaline earth metals, alkali metals, metal ions, and mixtures thereof, by means of depressurization and temperature increase; and
   (e) removing the portion of the precipitated crystals and/or particles from the organic fluid.

2. The method according to claim 1, wherein prior to step (a), the concentration of the at least one member selected from the group consisting of alkaline earth metals, alkali metals, metal ions, and mixtures thereof, is increased by means of diaphragm filtration (16).

3. The method according to claim 1, further including conducting the stream (5) of the solution to be treated to a nucleator (17, 31) mixing the stream (5) with a heated, super-saturated stream (25) of organic fluid containing at least one member selected from the group consisting of alkaline earth metals, alkali metals, metal ions, and mixtures thereof, depressurizing the streams (5, 25), and heating the combined stream and evaporated water and a portion of the organic fluid, removing a stream (10) of evaporated water and organic fluid, and removing a stream (20) of the organic fluid containing particles of crystallized members of alkaline earth metals, alkali metals, metal ions, and mixtures thereof.

4. The method according to claim 1 including conducting the stream (10) of vapor to a condensation unit (11) and condensing it to a water fraction (12) and an organic fluid fraction (13).

5. The method according to claim 1, including conducting the stream (20), optionally via a pump (27), to a heat exchanger (21), heating the stream (20) and recirculating the heated stream as a stream (22) in order to heat the stream (18), removing a portion of the stream (20) as a stream (23) and conducting the stream (23) to a particle reduction unit (24) as a stream (29), separating the stream (29) into a fraction (8) containing precipitated particles of at least one member selected from the group consisting of alkaline earth metals, alkali metals, metal ions, and mixtures thereof, and stream (30) containing the organic fluid, bringing the stream (30), optionally via a heat exchanger (26), into contact with a stream (5) of organic fluid, water and at least one member selected from the group consisting of alkaline earth metals, alkali metals, metal ions, and mixtures thereof, to be treated.

6. The method according to claim 1 wherein the organic fluid to be treated is selected from the group consisting of mono-ethylene glycol, di-ethylene glycol, tri-ethylene glycol, poly-ethylene glycol, and mixtures thereof.

* * * * *